(12) United States Patent  
Carrick et al.

(10) Patent No.: US 8,196,831 B2  
(45) Date of Patent: Jun. 12, 2012

(54) SYSTEMS AND METHODS FOR POWER SUPPLY SYNCHRONIZATION IN RADIO FREQUENCY IDENTIFICATION (RFID) READERS

(75) Inventors: John Carrick, Wakefield, MA (US); Robert R. Herold, Carlisle, MA (US); Francis Honore, Houston, TX (US)

(73) Assignee: Trimble Navigation Limited, Sunnyvale, CA (US)

( * ) Notice: Subject to any disclaimer, the term of this patent is extended or adjusted under 35 U.S.C. 154(b) by 501 days.

(21) Appl. No.: 12/425,932

(22) Filed: Apr. 17, 2009

(65) Prior Publication Data

US 2009/0261659 A1   Oct. 22, 2009

Related U.S. Application Data

(60) Provisional application No. 61/045,768, filed on Apr. 17, 2008.

(51) Int. Cl.  
*G06K 7/08* (2006.01)

(52) U.S. Cl. .......................................... 235/451; 235/492

(58) Field of Classification Search .................. 235/451, 235/492, 476; 340/10.1, 10.4, 10.5  
See application file for complete search history.

(56) References Cited

U.S. PATENT DOCUMENTS

| | | | |
|---|---|---|---|
| 5,583,850 A | 12/1996 | Snodgrass et al. | |
| 5,621,199 A * | 4/1997 | Calari et al. | 235/375 |
| 5,974,078 A | 10/1999 | Tuttle et al. | |
| 5,986,570 A | 11/1999 | Black et al. | |
| 6,375,780 B1 | 4/2002 | Tuttle et al. | |
| 7,265,674 B2 | 9/2007 | Tuttle | |
| 7,522,639 B1 * | 4/2009 | Katz | 370/503 |
| 2006/0261798 A1 * | 11/2006 | Brassfield et al. | 323/351 |
| 2008/0186180 A1 * | 8/2008 | Butler et al. | 340/572.1 |
| 2009/0040027 A1 * | 2/2009 | Nakao | 340/10.5 |
| 2009/0237218 A1 * | 9/2009 | Kim | 340/10.3 |

* cited by examiner

*Primary Examiner* — Ahshik Kim  
(74) *Attorney, Agent, or Firm* — Foley & Lardner LLP; John D. Lanza

(57) ABSTRACT

A system for power supply synchronization in an Radio Frequency Identification (RFID) reader is shown and described. In one embodiment, the system includes one or more switched mode power supply devices and a signal generator. Each of the switched mode power supply devices provides power to at least one component of the RFID reader. The signal generator transmits a synchronization signal of a controlling frequency to each of the one or more power supply devices. In one embodiment, the system includes a signal processing unit that is configured to reject one or more spectral components from the output of the RFID reader.

22 Claims, 6 Drawing Sheets

RFID Reader 100

SYSTEMS AND METHODS FOR POWER SUPPLY SYNCHRONIZATION IN RADIO FREQUENCY IDENTIFICATION (RFID) READERS

This application claims priority to U.S. Provisional Patent Application Ser. No. 61/045,768, filed on Apr. 17, 2008, entitled "SYSTEMS AND METHODS FOR POWER SUPPLY SYNCHRONIZATION IN RADIO FREQUENCY IDENTIFICATION (RFID) READERS", which is incorporated herein in its entirety by reference.

FIELD OF THE DISCLOSURE

The present disclosure relates to Radio Frequency Identification (RFID) systems. In particular, the present disclosure relates to methods and systems for synchronizing one or more switched mode power supplies connected to an RFID reader.

BACKGROUND

Switched mode power supplies are preferred over linear voltage regulators in RFID readers because of their power conversion efficiency and ability to produce voltage of both positive and negative polarities. However, due to rapid changes in energy flow at switching instants, switched mode power supplies produce spike-like noise. The spike-like noise at the switching instants have spectral energy that overlaps with the RFID signal response thereby degrading the signal to noise ratio (SNR) of the reader.

BRIEF SUMMARY

In one aspect, a system for power supply synchronization in a Radio Frequency Identification (RFID) reader is shown and described. In one embodiment, the system includes a plurality of switched mode power supply devices and a signal generator. Each of the switched mode power supply devices provides power to at least one component of the RFID reader. The signal generator transmits a synchronization signal of a controlling frequency to each of the one or more power supply devices. In one embodiment, the system includes a signal processing unit that is configured to reject one or more spectral components from the output of the RFID reader.

In another embodiment, the signal generator of the system includes an oscillator that, in communication with a digital divider circuit, generates the synchronization signal of the controlling frequency. In yet another embodiment, the controlling frequency is substantially equal to channel spacing between adjacent RFID channels. In still another embodiment, the signal generator further comprises a modulator that spreads the spectrum of the signal generated by the signal generator. In one embodiment, the oscillator has a duty cycle in agreement with the one or more switched mode power supply devices.

In another aspect, a method for power supply synchronization in an RFID reader is shown and described. The method includes generating, by a signal generator, a synchronization signal of a controlling frequency and receiving the synchronization signal by one or more switched mode power supply devices. The method further includes synchronizing the one or more switched mode power supply devices to the controlling frequency.

In one embodiment, the synchronizing occurs responsive to the synchronization signal received by the one or more switched mode power supply devices. In another embodiment, the controlling frequency is substantially equal to channel spacing between adjacent RFID channels.

In still another embodiment, the method includes generating, by an oscillator, a signal of a first frequency and dividing, by a digital divider circuit, the first frequency to generate the synchronization signal of the controlling frequency.

In yet another embodiment, the oscillator generating the signal of the first frequency operates with a duty cycle in agreement with the one or more switched mode power supply devices. In some embodiments, the method further includes spreading the spectrum of the first signal by a modulator.

In yet another aspect, a method of signal processing on an RFID reader is shown and described. The method includes generating, by a signal generator, a synchronization signal of a controlling frequency and synchronizing one or more switched mode power supply devices to the controlling frequency, each of the one or more devices supplying power to at least one component of the RFID reader. The method further includes controlling, by the signal generator, spectral locations of switching noise generated by the one or more switched mode power supply devices such that switching noise due to each of the one or more power supply devices appear at a substantially same spectral location or harmonics thereof. The method may also include rejecting the spectral components due to the switching noise by a filtering device.

In one embodiment, the method includes generating, by an oscillator, a first signal of a first frequency and dividing, by a digital divider circuit, the first frequency to generate the synchronization signal of the controlling frequency. In another embodiment, the controlling frequency is substantially equal to channel spacing between adjacent RFID channels. In still another embodiment, the oscillator operates with a duty cycle in agreement with the one or more switched mode power supply devices. In yet another embodiment, the method further includes spreading the spectrum of the first signal.

In another embodiment, the rejecting step comprises removing a spectral component due to a direct current (DC) bias. In yet another embodiment, the method includes removing spectral components due to responses from adjacent RFID readers.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
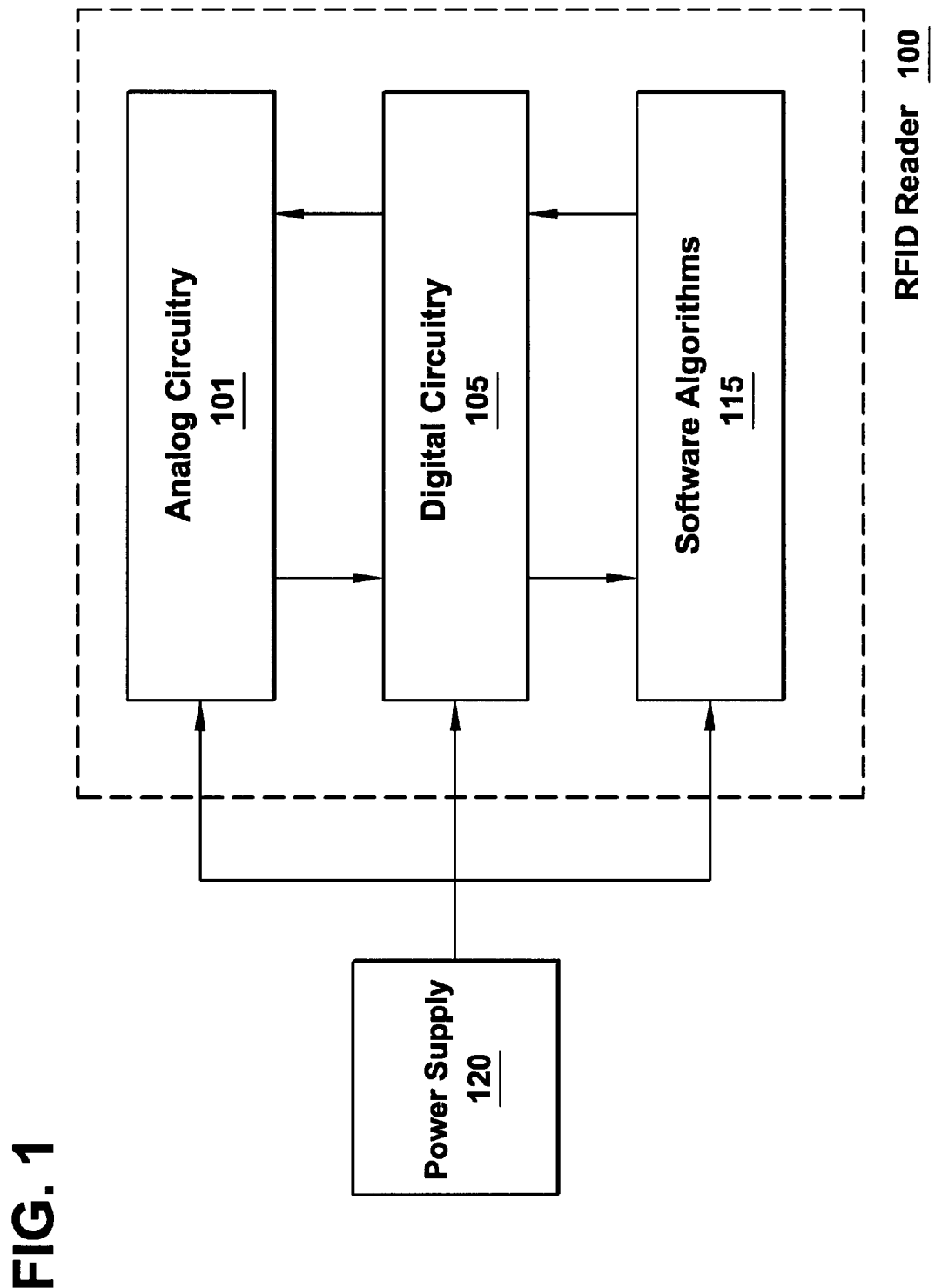
FIG. 1 is a block diagram depicting an embodiment of an RFID reader.

Referring now to FIG. 1, an embodiment of an RFID reader 100 is depicted. In brief overview, the RFID reader 100 includes analog circuitry 101 and digital circuitry 105. The RFID reader 100 is powered by a power supply 120 connected to the reader 100. The reader 100 also comprises software algorithms 115 to process the data acquired by the analog and digital circuitry.

In an operational overview, the analog circuitry 101 receives analog radio frequency (RF) signals from an RFID tag. The analog circuitry 101 forwards the analog signal to the digital circuitry 105. The digital circuitry 105 converts the analog signal to digital signal and processes it in communication with the software algorithms 115 to extract information. In one embodiment, the digital circuitry 105 converts digital signals to analog form to forward to the analog circuitry 101. In one embodiment, the analog circuitry 101 transmits the analog signal received from the digital circuitry 105 by means of antenna elements in the RFID reader 100.

In one embodiment, the analog circuitry 101 comprises antenna elements receiving and transmitting radio frequency (RF) signals, a plurality of filters and amplifier circuits. In operation, the antenna elements receive response signals from the RFID tags in the vicinity of the reader 100. The antenna elements may filter and/or amplify the signals. The antenna elements may then forward the signals to the digital circuitry 105. The analog circuitry 101 is described below in further details with reference to FIG. 2A.

Still referring to FIG. 1, in one embodiment, signal from the analog circuitry 101 is sent to the digital circuitry 105 through an analog to digital converter (ADC). The ADC samples and digitizes the analog signal. In another embodiment, signal from the digital circuitry 105 is transmitted to the analog circuitry 101 through a digital to analog converter (DAC). In still another embodiment, the digital circuitry 105 includes a digital signal processor (DSP) that implements or executes the software algorithms 115 of the RFID reader 100. The digital circuitry 105 is described in further details with reference to FIG. 2B.

In some embodiments, the software algorithms 115 of the RFID reader 100 extract information from electrical signals of the digital circuitry 105. In one of these embodiments, the software algorithms 115 perform, but are not limited to, one or more of the following operations: modulation, demodulation, data encoding, data decoding and waveform detection. In another of these embodiments, the software algorithms 115 perform or coordinate various combinations of the above mentioned operations.

In some embodiments, the software algorithms 115 are capable of modulating and demodulating one or more waveforms. These waveforms may be communicated as signals from the digital circuitry 105. The modulation and demodulation schemes supported by the software algorithms 115 may include, but are not limited to: amplitude shift keying (ASK), frequency shift keying (FSK), phase shift keying (PSK), double sideband ASK (DSB-ASK), single sideband ASK (SSB-ASK) and phase reversal ASK (PR-ASK).

In other embodiments, several data encoding and decoding schemes are supported by the software algorithms 115. In one embodiment, the software algorithms 115 support Miller encoding. In another embodiment, the software algorithms 115 support pulse interval encoding (PIE). In still another embodiment, the software algorithms 115 support FM0 encoding. In still other embodiments, the software algorithms 115 support one or more of a plurality of possible data encoding schemes as apparent to one ordinarily skilled in the art.

The power supply 120 provides power to one or more components of the RFID reader 100. In some embodiments, the power supply 120 comprises a plurality of power supply modules. In other embodiments, the power supply 120 is a single unit providing power to different components of the RFID reader 100. In one of these embodiments, the power supply module is a switched mode power supply device. In another embodiment, the power supply module is a linear voltage regulator. In some embodiments, the power supply 120 may include a signal generator. The power supply 120 is described in further details in connection with FIG. 3.

Figure 2A:
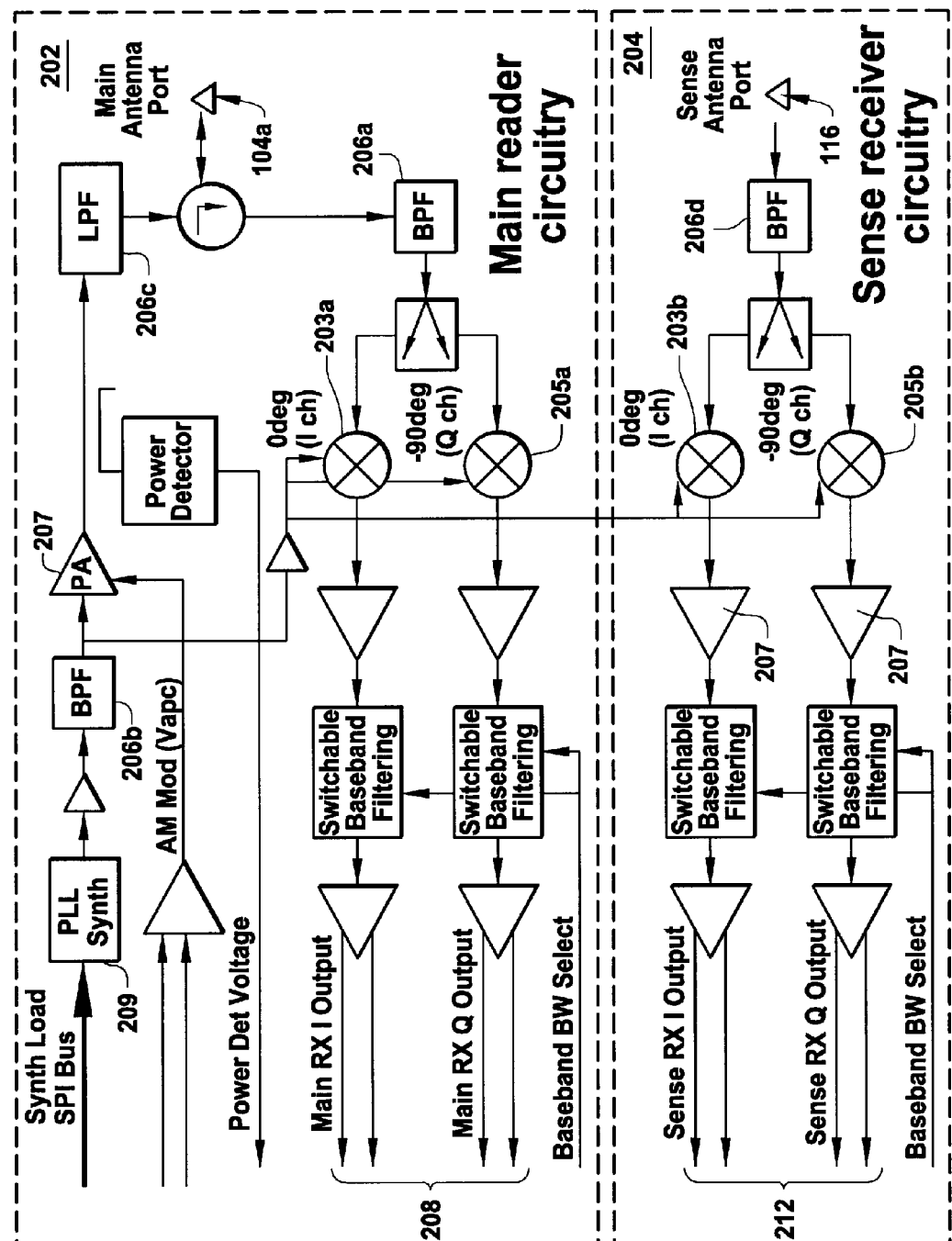
FIG. 2A is a block diagram depicting an embodiment of the analog circuitry in an RFID reader.

Referring now to FIG. 2A, one embodiment of the analog circuitry 101 includes main reader circuitry 202 and sense receiver circuitry 204. As shown in FIG. 2A, the main reader circuitry 202 includes various components such as an in-phase demodulator 203a, a quadrature phase demodulator 205a, one ore more filters 206a-206c, one or more amplifiers 207, one or more phase locked loops (PLL) 209. One or more of the various components of the main reader circuitry 200 may communicate with the sense receiver circuitry 204. In one embodiment, the main reader circuitry 202 comprises a main antenna 104a. The antenna elements 104a can be one or more of a plurality of possible types. For example, the antenna elements 104a can be, but are not limited to, patch antennas, waveguide slot antennas and dipole antennas. In one embodiment, each antenna element 104a of the RFID reader 100 can be of the same type. In another embodiment, the RFID reader 100 incorporates two or more different types of antenna elements 104a. In some embodiments, one or more of the antenna elements 104a includes a plurality of antenna elements (i.e., an array of antenna elements). In some embodiments, the antenna elements 104a are multiplexed.

In some embodiments, the sense receiver circuitry 204 includes a sense antenna port 116. In one embodiment, the sense receiver circuitry 204 includes a in-phase demodulator 203b, a quadrature phase demodulator 205b, one or more filters 206d, and one or more amplifiers 207. In one of these embodiments, the sense receiver circuitry 204 is an additional quadrature demodulator that is a replica of, or substantially similar to, the main reader circuitry 202.

The sense antenna 116 can take various forms. In some embodiments, the sense antenna 116 can be, but is not limited to, patch antennas, waveguide slot antennas, dipole antennas, and the like. In some of these embodiments, any type of antenna can be used as the sense antenna 116. In certain embodiments, the sense antenna element 116 need not be collocated with the reader 100. In other embodiments, the sense antenna 116 is one of the antenna elements 104a of the RFID reader system 100 that is not in use for the tag response signal reception task. In one embodiment, the RFID reader 100 can include circuitry and/or software that provides the ability to choose among the antenna elements 104 an antenna element that is dedicated as the sense antenna 116.

Figure 2B:
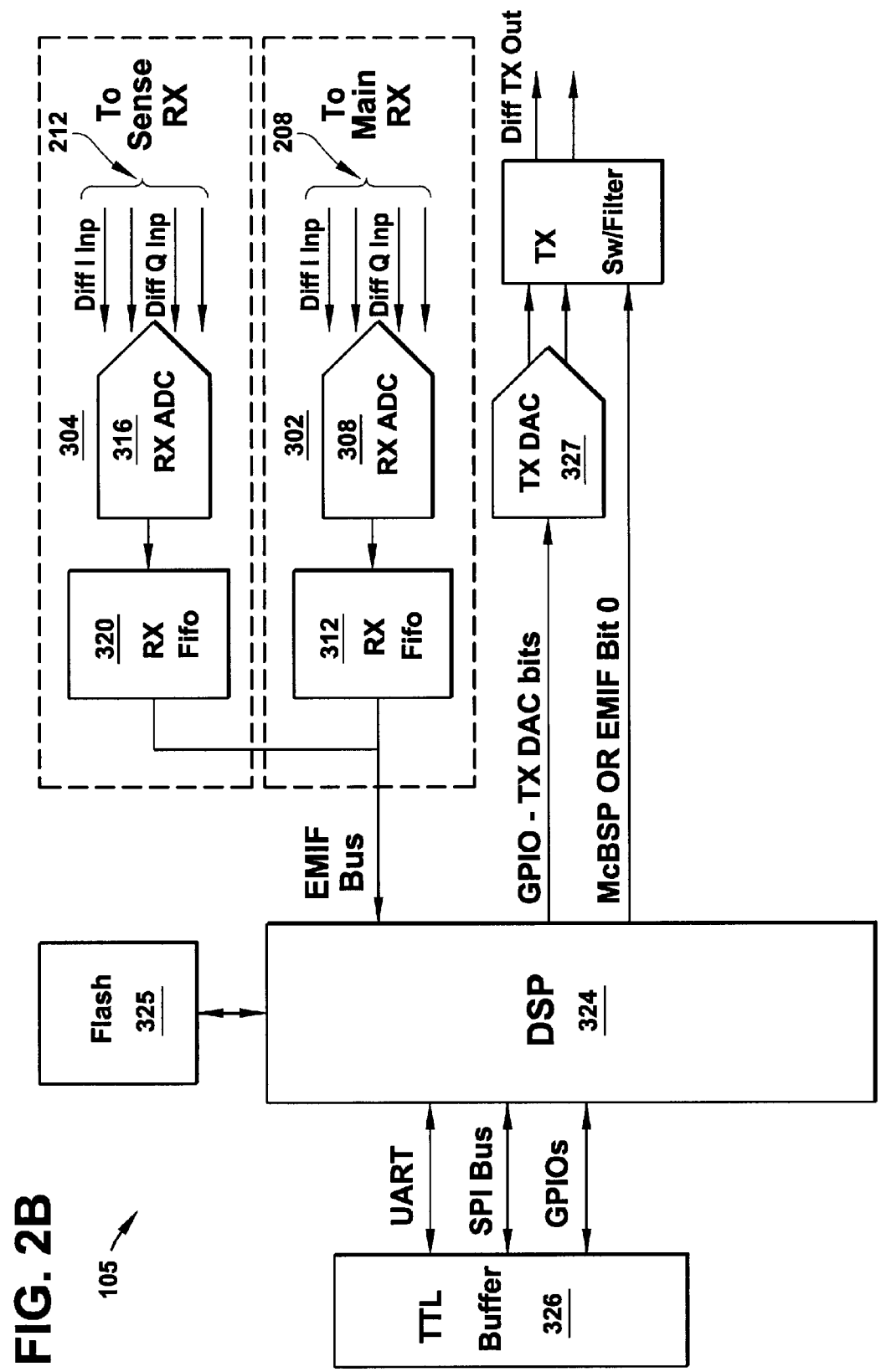
FIG. 2B is a block diagram depicting an embodiment of the digital circuitry in an RFID reader.

With reference to FIG. 2B, one embodiment of the digital circuitry 105 of the RFID reader 100 is shown and described. The digital circuitry 105 includes a main digital receiver section 302 and sense digital receiver section 304. In one embodiment, the main digital receiver section 302 includes an analog to digital converter 308 (RX ADC) in communication with the main reader circuitry 202 of FIG. 2A. The analog to digital converter 308 may receive analog response signals 208 from the main reader circuitry 202. The RX ADC 308 may also communicate with a first-in-first-out (RX FIFO) memory 312. Although shown as having a single ADC 308, other embodiments can include a plurality of additional RX ADCs 308. For example, each of the in-phase signal and quadrature phase signals can be fed into a respective ADC 308. Also, additional FIFO memories 312 can be used to store each of the respective digitized signals.

In one embodiment, the sense digital receiver section 304 includes an analog to digital converter 316 (RX ADC) that communicates with the main reader circuitry 202 to receive the analog noise-plus-interference signals 212 from the main reader circuitry 202. The RX ADC 316 communicates with a first-in-first-out (FIFO) memory 320. Although shown as having a single RX ADC 308, it should be understood that any number of RX ADCs 308 can be used. For example, each of the in-phase signal and quadrature signals can be fed into a respective RX ADC 308. Also, additional FIFO memories 320 can be used to store each of the respective digitized signals.

In operation, once the sense antenna signals 212 and the reader antenna signals 208 are received and digitized, the digitized signals are communicated to a digital signal processor (DSP) 324 via an External Memory Interface (EMIF) bus. In some embodiments, the DSP periodically accesses the FIFO memories, retrieves the digitized signals, and processes the digital signals. In some embodiments, the software algorithms 115 of the RFID reader 100 are executed by the DSP 324.

In one embodiment, the DSP 324 is connected to a memory, such as a flash memory 325. In another embodiment, the DSP 324 communicates with a transistor-transistor logic (TTL) buffer. The DSP 324 is connected to the TTL buffer via one or more connections including General Purpose Input/Output (GPIO) pins, Serial Peripheral Interface (SPI) and Universal Asynchronous Receiver/Transmitter (UART).

In one embodiment, the transmitter section of the digital circuitry 105 includes a digital to analog converter (TX-DAC) 327. In some embodiments, the TX-DAC interfaces with the analog circuitry 101 via a filtering unit. In one of these embodiments, the filtering unit communicates with the DSP 324 via a Multi-channel Buffer Serial Port (McBSP). In another embodiment, the TX-DAC communicates with the DSP 324 through GPIO pins.

Figure 3:
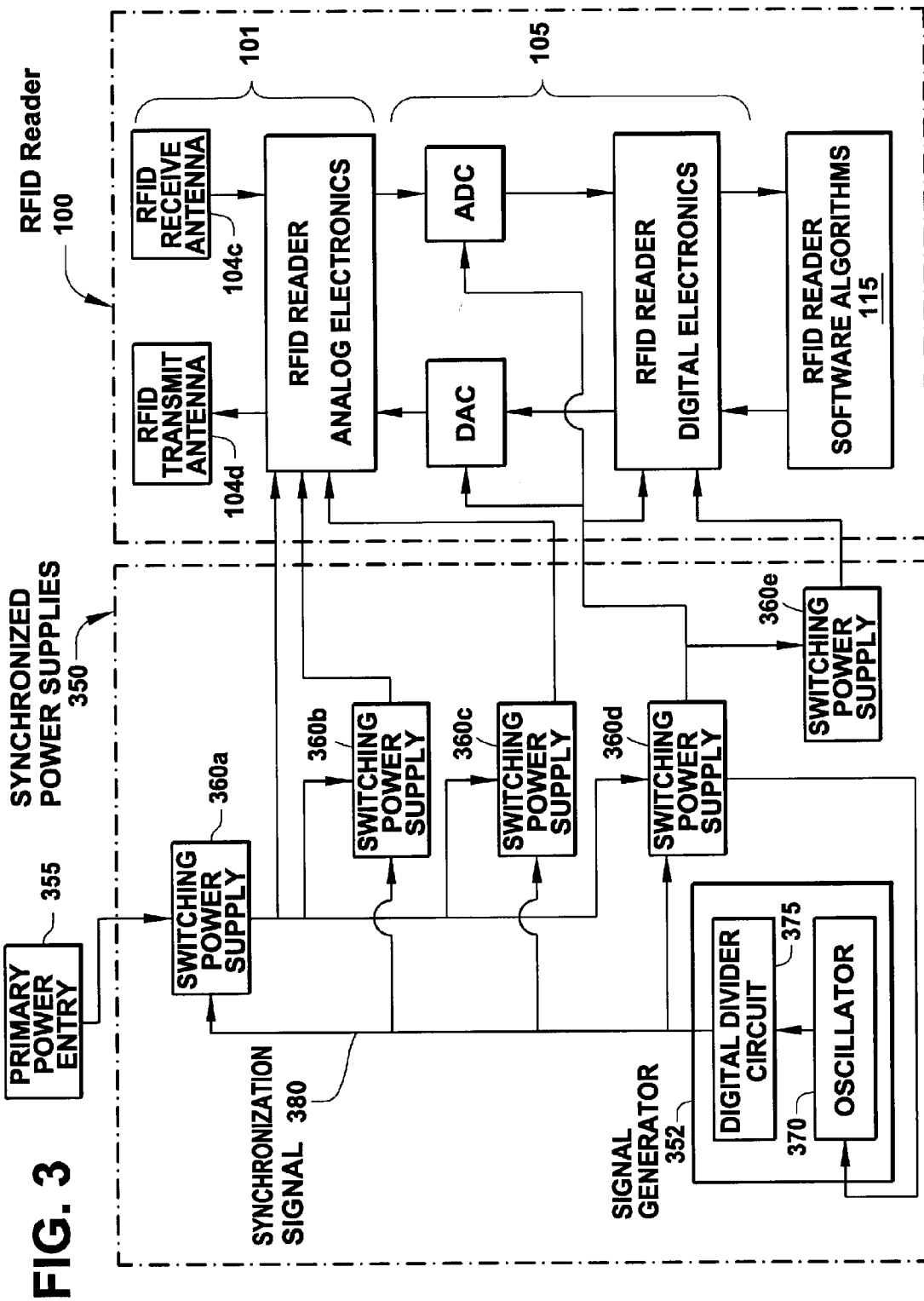
FIG. 3 is a block diagram depicting a synchronized power supply connected to an RFID reader.

Referring now to FIG. 3, an embodiment of an RFID reader 100 with synchronized power supplies 350 is depicted. The system includes an RFID reader 100 in communication with a system of synchronized power supplies 350. In one embodiment, the RFID reader 100 comprises analog circuitry 101, digital circuitry 105 and software algorithms 115 as described above in connection with to FIG. 1. In some embodiments, the analog circuitry 101 comprises analog electronics circuit, a transmit antenna 104*b* and a receive antenna 104*c*. The analog circuitry 101 communicates with the digital circuitry 105. In one embodiment, the digital circuitry 105 comprises digital electronics circuitry, a DAC 327 and an ADC 308. In another embodiment, the digital circuitry 105 communicates with the software algorithms 115.

In one embodiment, the RFID reader 100 is powered by the synchronized power supplies 350. The system of synchronized power supplies includes one or more switched mode power supplies 360*a*-360*e*, referred to generally as a switched mode power supply 360, and a signal generator 352. Each of the switched mode power supplies 360 can provide power to at least one component of the RFID reader 100. In some embodiments, the synchronized power supplies 350 receives input power from a primary power entry 355. In one embodiment, the primary power entry 355 is a wall socket. In another embodiment, the primary power entry 355 is a power brick connected to a wall socket. In still another embodiment, the primary power entry is a wall-wart. ["Wall wart" and "power brick" are terms for a linear or switched-mode power supply (or in some cases just a transformer) that may be embedded in an over-sized AC plug that is built into the top of a plug. A power brick may also encompass the same type of power supply when embedded in the AC line cord power feed.] In these embodiments, the input voltage supplied by the primary power entry 355 may be substantially equal to 24 volts. In yet another embodiment, the primary power entry is a Power Over Ethernet power tap. In this embodiment, the input voltage supplied by the primary power entry is in the range of 40-58 volt. In some embodiments, the primary power entry 355 powers the switched mode power supply 360*a* which in turn powers one or more other switched mode power supplies 360.

In one embodiment, the one or more switched mode power supplies 360 are substantially identical to each other. In other embodiments, at least one of the switched mode power supplies differ in specifications from the other switched mode power supplies. In one embodiment, the switched mode power supplies 360 comprise a voltage regulator. In one embodiment, the switched mode power supply 360*a* is controlled by an integrated circuit such as LM5071 manufactured by National Semiconductor of Santa Clara, Calif.

In some embodiments, the switched mode power supplies 360*b*-360*d* comprise integrated circuits such as LTC 1877 manufactured by Linear Technologies of Milpitas, Calif. In one embodiment, the switched mode power supply 360*b* generates an output voltage substantially equal to 5 volts. In another embodiment the switched mode power supplies 360*c* and 360*d* generate output voltages of 3.3 volts each. In still another embodiment, the switched mode power supply 360*e* generates an output voltage substantially equal to 1.1 volt. In other embodiments, the switched mode power supplies 360 may comprise of other components and generate other output voltages as apparent to one skilled in the art.

In some embodiments, the one or more switched mode power supplies 360 are synchronized with the others by a synchronization signal 380 generated by the signal generator 352. In one embodiment, the signal generator comprises an oscillator 370. In another embodiment, the oscillator 370 comprises a crystal that oscillates to generate a signal of a reference frequency when triggered by an external signal. In still another embodiment, the external signal is provided from oscillator pins of a digital signal processor such as the BF537 manufactured by Analog Devices of Norwood, Mass. In yet another embodiment, the digital signal processor buffers the oscillator output and sends it to a digital divider circuit 375.

In one embodiment, the digital divider circuit 375 is a part of the signal generator as shown in FIG. 3. In other embodiments, the digital divider circuit 375 may be external to the signal generator 352. In one embodiment, the digital divider circuit 375 is a dedicated hard wired unit. In another embodiment, the digital divider circuit 375 is realized via a programmable logic device such as LCMX0256C manufactured by Lattice Semiconductor of Hillsboro, Oreg. In some embodiments, the digital divider circuit 375 divides the frequency of the signal generated by the oscillator 370 by a predetermined factor to generate the synchronization signal 380. In other embodiments, the digital divider circuit 375 controls the duty cycle of the synchronization signal 380 to comply with the input requirements of a switched mode power supply 360 that is synchronized.

In some embodiments, the synchronization signal 380 has a frequency substantially equal to the frequency spacing between adjacent RFID channels. In one embodiment, the spacing between adjacent RFID channels are specified in protocols and standards such as "EPC™ Radio-Frequency Identity Protocols Class-1 Generation-2 UHF RFID Protocol for Communications at 860 MHz-960 MHz version 1.0.9." In some embodiments, the synchronization signal 380 is generated using spread spectrum techniques. In one of these embodiments, the spectrum of the signal generated by the oscillator 370 is spread and made to look like pseudo random noise. In another embodiment, the spreading is achieved using direct sequence spread spectrum techniques. In still another embodiment, the spreading is achieved using frequency hopping spread spectrum techniques.

Figure 4:
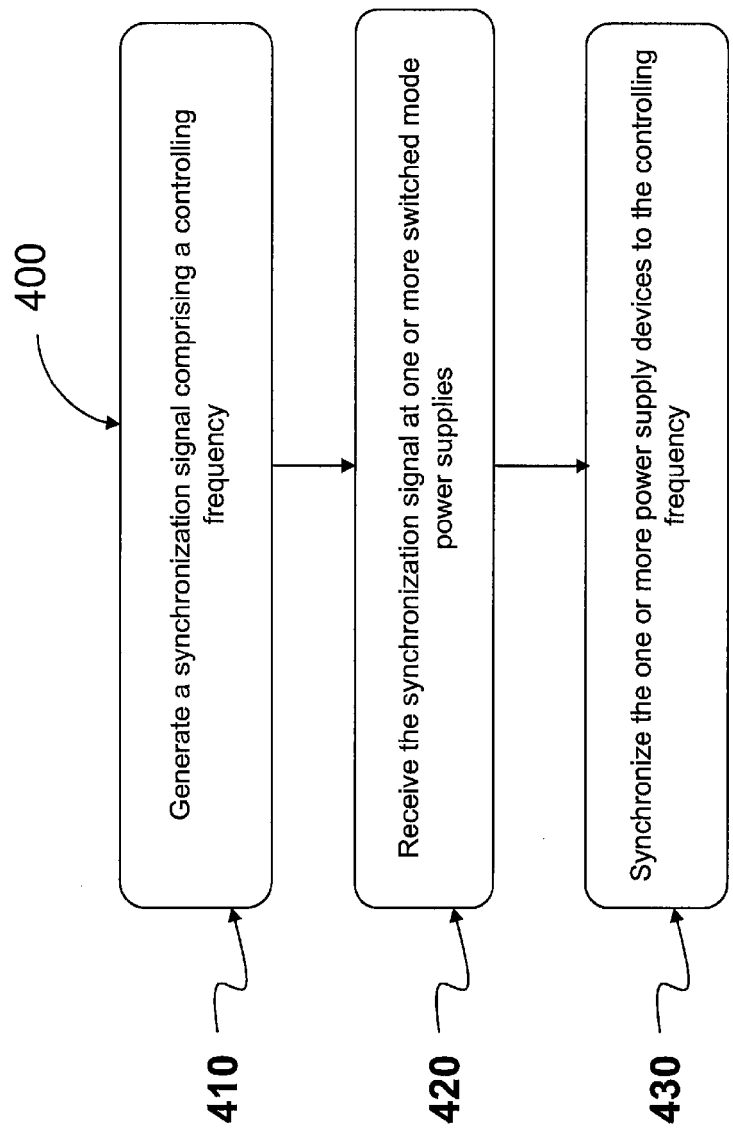
FIG. 4 is a flow diagram depicting an embodiment of the steps taken in a method to achieve synchronization of one or more switched mode power supply devices.

Referring now to FIG. 4, an embodiment of a method 400 that synchronizes one or more switched mode power supplies for an RFID reader 100 is depicted. In brief overview, a signal generator 352 generates (step 410) a synchronization signal 380 of a controlling frequency. One or more switched mode power supplies 360 receive (step 420) the synchronization signal 380, each of the one or more the power supplies providing power to at least one component of an RFID reader 100. The one or more power supplies are synchronized (step 430) to the controlling frequency.

In one embodiment, generation of the synchronization signal in step 410 is carried out by a signal generator comprising an oscillator 370 and a digital divider circuit 375 as described above in connection with FIG. 3.

Figure 5:
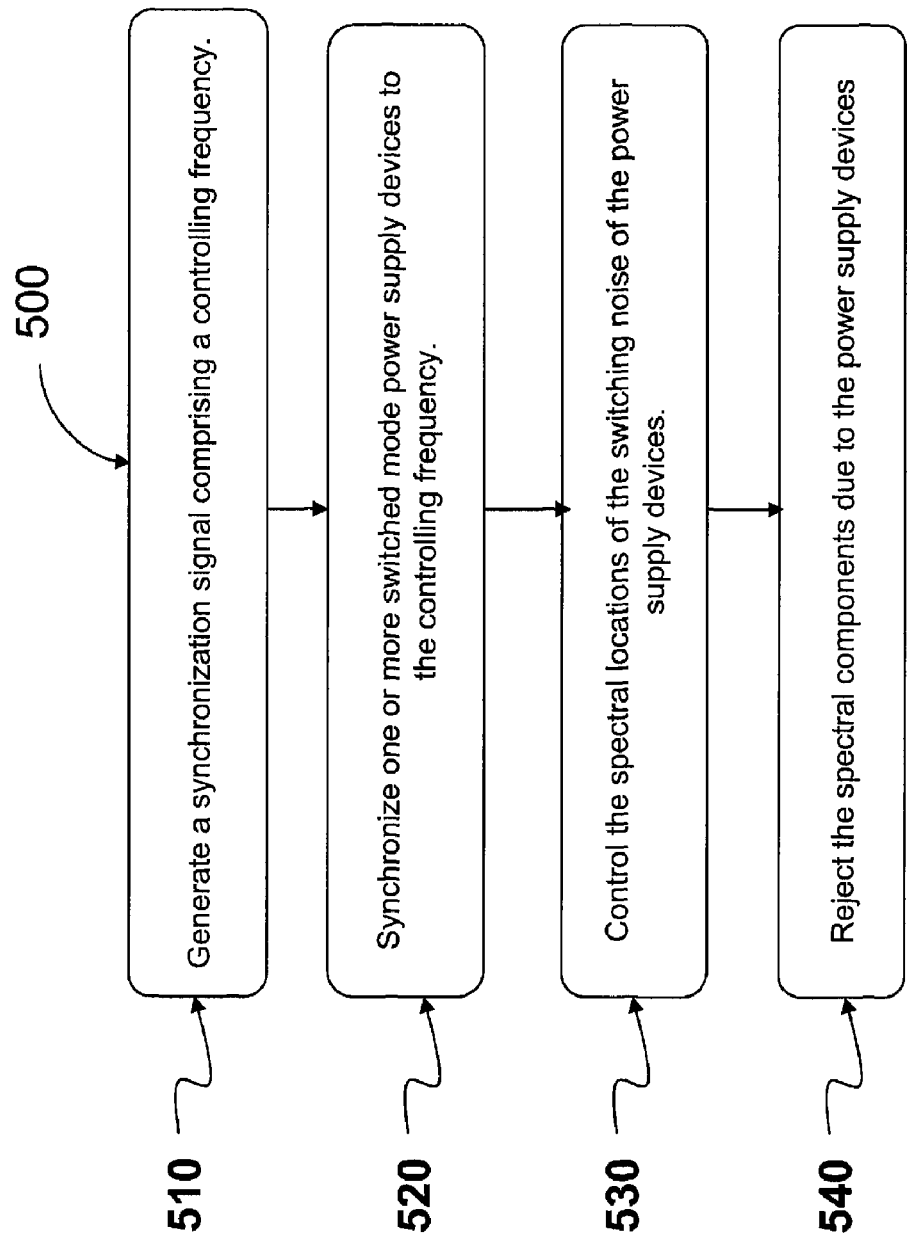
FIG. 5 is a flow diagram depicting an embodiment of the steps taken in a signal processing method of achieving synchronization of one or more switched mode power supply devices.

Referring now to FIG. 5, steps taken in an embodiment of a signal processing method 500 is depicted. The method 500 achieves synchronization of one or more switched mode power supplies providing power to an RFID reader 100 and rejection of switching noise due to the one or more power supplies. In brief overview, a synchronization signal 380 of a controlling frequency is generated (step 510). One or more switched mode power supplies are synchronized (step 520) to the controlling frequency. The spectral locations of the switching noise due to the switched mode power supplies are controlled (step 530). A filter rejects (step 540) the spectral components due to the power supply noise.

In some embodiments, a signal generator 352 generates the synchronization signal in step 510. In one embodiment, the signal generator may include an oscillator 370 generating a signal of a reference frequency. In another embodiment, the signal generator may include a digital divider circuit 375 that divides the frequency of the signal generated by the oscillator 370. In still another embodiment, the synchronization signal 380 generated by the oscillator 370 in communication with the digital divider circuit 375 synchronizes (step 520) the one or more switched mode power supplies 360.

The spectral location of the switching noise is controlled (step 530) by the synchronization signal 380. In one embodiment, the frequency of the synchronization signal 380 is controlled such that the spectral noise due to each of the one or more power supplies 360 appear at a substantially same spectral location. In another embodiment, the spectral noise due to each of the one or more power supplies 360 appear at harmonics of the substantially same spectral location. In another embodiment, rejecting a spectral noise component due to one switched mode power supply 360 results in rejecting spectral noise components due to one or more of the other switched mode power supplies 360 as the noise components appear at a substantially same location or the harmonics thereof. In still another embodiment, the switching noise due to the different switched mode power supplies 360 are spaced in a scheme such that filtering for adjacent RFID channel rejection rejects or substantially rejects the switching noise. In this embodiment, separate signal processing may not be required to reject noise components due to power supply switching. In yet another embodiment, the signal processing method ensures that spectral components at multiples of adjacent RFID channel spacing fold to the same frequency due to decimation.

The filter that rejects (step 540) the spectral components due to switching noise can be implemented in a plurality of ways. In one embodiment, the filter can be implemented in a digital signal processor unit external (not shown) to the RFID reader 100. In another embodiment the filter may be implemented in the DSP 324 of the RFID reader digital circuitry 105. In one embodiment, the filter is a digital high pass filter. In another embodiment the filter is a band pass filter. In still another embodiment, the filter rejects an undesired direct current DC bias. In yet another embodiment the filter rejects responses from one or more adjacent RFID channels.

Having described certain embodiments of methods and systems for power supply synchronization for RFID readers, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for power supply synchronization in a Radio Frequency Identification (RFID) reader, the system comprising:
   one or more switched mode power supply devices, each of the one or more devices providing power to at least one component of an RFID reader; and
   a signal generator, in communication with each of the one or more switched mode power supply devices, transmitting a synchronization signal comprising a controlling frequency to each of the one or more switched mode power supply devices, wherein the controlling frequency is chosen to be substantially equal to an integer multiple of a channel spacing between adjacent RFID channels.

2. The system of claim 1 further comprising a signal processing unit in communication with the RFID reader, rejecting one or more spectral components from an output of the RFID reader.

3. The system of claim 1, wherein the signal generator comprises an oscillator.

4. A system for power supply synchronization in a Radio Frequency Identification (RFID) reader, the system comprising:
   one or more switched mode power supply devices, each of the one or more devices providing power to at least one component of an RFID reader; and
   a signal generator, in communication with each of the one or more switched mode power supply devices, transmitting a synchronization signal comprising a controlling frequency to each of the one or more switched mode power supply devices, wherein the signal generator comprises an oscillator, in communication with a digital divider circuit, generating the synchronization signal comprising the controlling frequency.

5. The system of claim 4 further comprising a modulator, in connection with the oscillator and digital divider circuit, spreading the spectrum of the generated signal.

6. The system of claim 4, wherein the oscillator has a duty cycle substantially in agreement with a duty cycle requirement of the one or more switched mode power supply devices.

7. A method for power supply synchronization in a Radio Frequency Identification (RFID) reader, the method comprising:
   generating, by a signal generator, a synchronization signal comprising a controlling frequency;
   receiving, by one or more switched mode power supply devices in communication with one or more components of a Radio Frequency Identification (RFID) reader, the synchronization signal; and
   synchronizing the one or more switched mode power supply devices to the controlling frequency, wherein the controlling frequency is substantially equal to an integer multiple of a channel spacing between adjacent RFID channels.

8. The method of claim 7, wherein the synchronizing occurs responsive to the one or more switched mode power supply devices receiving the synchronizing signal.

9. The method of claim 7, further comprising rejecting one or more spectral components from an output of the RFID reader.

10. A method for power supply synchronization in a Radio Frequency Identification (RFID) reader, the method comprising:
generating, by a signal generator, a synchronization signal comprising a controlling frequency;
receiving, by one or more switched mode power supply devices in communication with one or more components of a Radio Frequency Identification (RFID) reader, the synchronization signal;
synchronizing the one or more switched mode power supply devices to the controlling frequency; and
generating, by an oscillator, a first signal of a first frequency and dividing, by a digital divider circuit, the frequency of the first signal to generate the synchronization signal.

11. The method of claim 10, wherein the oscillator has a duty cycle substantially in agreement with a duty cycle requirement of the one or more switched mode power supply devices.

12. The method of claim 10 further comprising spreading, in communication with a modulator, the spectrum of the first signal.

13. A system for power supply synchronization in a Radio Frequency Identification (RFID) reader, the system comprising:
means for generating a synchronization signal of a controlling frequency;
means for receiving, by one or more switched mode power supply devices in communication with one or more components of a Radio Frequency Identification (RFID) reader, the synchronization signal; and
means for synchronizing the one or more switched mode power supply devices to the controlling frequency, wherein the controlling frequency is substantially equal to an integer multiple of a channel spacing between adjacent RFID channels.

14. A method of signal processing on a Radio Frequency Identification (RFID) reader, the method comprising:
generating, by a signal generator, a controlling frequency;
generating, by an oscillator, a first signal of a first frequency and dividing, by a digital divider circuit, the frequency of the first signal to generate a synchronization signal comprising the controlling frequency;
synchronizing one or more switched mode power supply devices to the controlling frequency, each of the one or more switched mode power supply devices providing power to at least one component of the RFID reader;
controlling, by the signal generator, spectral location of switching noise of the one or more switched mode power supply devices such that the switching noise of each of the one or more switched mode power supply devices appear at a substantially same spectral location and harmonics thereof; and
rejecting, by a filtering device, spectral components due to the switching noise of the one or more switched mode power supply devices.

15. The method of claim 14, wherein the filtering device comprises a digital filter.

16. The method of claim 14, wherein the oscillator has a duty cycle substantially in agreement with a duty cycle requirement of the one or more switched mode power supply device.

17. The method of claim 14 further comprising spreading, in communication with a modulator, the spectrum of the first signal.

18. The method of claim 14, wherein the filtering device comprises a digital filter.

19. The method of claim 14, wherein the filtering device comprises an analog filter.

20. A method of signal processing on a Radio Frequency Identification (RFID) reader, the method comprising:
generating, by a signal generator, a controlling frequency, wherein the controlling frequency is substantially equal to an integer multiple of a channel spacing between adjacent RFID channels;
synchronizing one or more switched mode power supply devices to the controlling frequency, each of the one or more switched mode power supply devices providing power to at least one component of the RFID reader;
controlling, by the signal generator, spectral location of switching noise of the one or more switched mode power supply devices such that the switching noise of each of the one or more switched mode power supply devices appear at a substantially same spectral location and harmonics thereof; and
rejecting, by a filtering device, spectral components due to the switching noise of the one or more switched mode power supply devices.

21. A method of signal processing on a Radio Frequency Identification (RFID) reader, the method comprising:
generating, by a signal generator, a controlling frequency;
synchronizing one or more switched mode power supply devices to the controlling frequency, each of the one or more switched mode power supply devices providing power to at least one component of the RFID reader;
controlling, by the signal generator, spectral location of switching noise of the one or more switched mode power supply devices such that the switching noise of each of the one or more switched mode power supply devices appear at a substantially same spectral location and harmonics thereof; and
rejecting, by a filtering device, spectral components due to the switching noise of the one or more switched mode power supply devices, wherein the rejecting step further comprises removing a spectral component due to a direct current (DC) bias.

22. A method of signal processing on a Radio Frequency Identification (RFID) reader, the method comprising:
generating, by a signal generator, a controlling frequency;
synchronizing one or more switched mode power supply devices to the controlling frequency, each of the one or more switched mode power supply devices providing power to at least one component of the RFID reader;
controlling, by the signal generator, spectral location of switching noise of the one or more switched mode power supply devices such that the switching noise of each of the one or more switched mode power supply devices appear at a substantially same spectral location and harmonics thereof; and
rejecting, by a filtering device, spectral components due to the switching noise of the one or more switched mode power supply devices, wherein the rejecting step further comprises removing spectral components due to responses from adjacent RFID readers.

* * * * *